United States Patent
Seo et al.

(10) Patent No.: US 10,716,093 B2
(45) Date of Patent: Jul. 14, 2020

(54) METHOD FOR ALLOCATING RESOURCES FOR DIRECT COMMUNICATION BETWEEN TERMINALS IN WIRELESS COMMUNICATION SYSTEM AND DEVICE THEREFOR

(71) Applicant: LG ELECTRONICS INC., Seoul (KR)

(72) Inventors: Hanbyul Seo, Seoul (KR); Hyukjin Chae, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/764,858

(22) PCT Filed: Sep. 30, 2016

(86) PCT No.: PCT/KR2016/010980
§ 371 (c)(1),
(2) Date: Mar. 29, 2018

(87) PCT Pub. No.: WO2017/057952
PCT Pub. Date: Apr. 6, 2017

(65) Prior Publication Data
US 2019/0045485 A1    Feb. 7, 2019

Related U.S. Application Data

(60) Provisional application No. 62/236,819, filed on Oct. 2, 2015, provisional application No. 62/236,862, filed (Continued)

(51) Int. Cl.
*H04W 72/04*    (2009.01)
*H04L 5/00*    (2006.01)
(Continued)

(52) U.S. Cl.
CPC .......... *H04W 72/04* (2013.01); *H04L 5/0044* (2013.01); *H04L 5/0053* (2013.01); *H04W 76/23* (2018.02); *H04W 88/04* (2013.01); *H04W 92/18* (2013.01)

(58) Field of Classification Search
CPC ........ H04W 72/04; H04W 76/14; H04W 4/70
See application file for complete search history.

(56) References Cited

U.S. PATENT DOCUMENTS

2013/0059583 A1    3/2013    Van Phan et al.
2013/0223353 A1    8/2013    Liu et al.
(Continued)

OTHER PUBLICATIONS

PCT International Application No. PCT/KR2016/010980, Notification of Transmittal of the International Search Report and the Written Opinion of the International Searching Authority, or Declaration dated Jan. 19, 2017, 9 pages.
(Continued)

*Primary Examiner* — Shukri Taha
(74) *Attorney, Agent, or Firm* — Lee Hong Degerman Kang Waimey

(57) ABSTRACT

The present application discloses a method for allocating resources for direct communication between terminals in a wireless communication system. Specifically, the method for allocating resources comprises: a step of configuring a first periodic resource so as to transmit multiple messages via direct communication between the terminals; and a step of transmitting the multiple messages by using the first periodic resource if a coding rate corresponding to the first periodic resource is below a maximum coding rate configured by an upper layer, wherein, if the coding rate is equal to or above the maximum coding rate, the first periodic resource is released and a second periodic resource is configured.

10 Claims, 10 Drawing Sheets

Related U.S. Application Data on Oct. 3, 2015, provisional application No. 62/271,298, filed on Dec. 27, 2015, provisional application No. 62/295,152, filed on Feb. 15, 2016, provisional application No. 62/300,019, filed on Feb. 25, 2016.

(51) Int. Cl.
    *H04W 88/04*      (2009.01)
    *H04W 76/23*      (2018.01)
    *H04W 92/18*      (2009.01)

(56) References Cited

U.S. PATENT DOCUMENTS

| | | | | |
|---|---|---|---|---|
| 2013/0287012 | A1* | 10/2013 | Pragada | H04W 76/25 370/338 |
| 2014/0185530 | A1* | 7/2014 | Kuchibhotla | H04W 4/90 370/329 |
| 2016/0128082 | A1* | 5/2016 | Chen | H04W 72/10 370/329 |
| 2017/0208554 | A1* | 7/2017 | Hoshino | H04W 52/146 |
| 2018/0139724 | A1* | 5/2018 | Loehr | H04W 72/02 |

OTHER PUBLICATIONS

Ericsson, "Discussion on V2V Scheduling, Resource Pools and Resource Patterns", 3GPP TSG RAN WG1 Meeting #82bis, R1-155909, Oct. 2015, 6 pages.

Beijing Xinwei Telecom Techn., V2X resource allocation with cooperative diversity, 3GPP TSG RAN WG1 Meeting #82bis, R1-155954, Oct. 2015, 5 pages.

ZTE, "Resource allocation enhancement for V2V based on PC5", 3GPP TSG RAN WG1 Meeting #82bis, R1-155231, Oct. 2015, 6 pages.

* cited by examiner (A) CONTROL-PLANE PROTOCOL STACK (B) USER-PLANE PROTOCOL STACK D2D signal transmission
from UE to which resource unit #0
is allocated

METHOD FOR ALLOCATING RESOURCES FOR DIRECT COMMUNICATION BETWEEN TERMINALS IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/010980, filed on Sep. 30, 2016, which claims the benefit of U.S. Provisional Application No. 62/236,819, filed on Oct. 2, 2015, 62/236,862, filed on Oct. 3, 2015, 62/271,298, filed on Dec. 27, 2015, 62/295,152, filed on Feb. 15, 2016, and 62/300,019, filed on Feb. 25, 2016, the contents of which are all hereby incorporated by reference herein in their entirety.

TECHNICAL FIELD

The present invention relates to a wireless communication system, and more particularly, to a method of allocating resources for direct communication between terminals in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the present invention proposes a method of allocating resources for direct communication between terminals in a wireless communication system and an apparatus therefor in the following.

Technical Solution

To achieve these and other advantages and in accordance with the purpose of the present invention, as embodied and broadly described, according to one embodiment, a method of allocating a resource for direct communication between terminals in a wireless communication system, includes the steps of setting a first periodic resource to transmit multiple messages via the direct communication between the terminals, and if a coding rate corresponding to the first periodic resource is less than a maximum coding rate configured by an upper layer, transmitting the multiple messages using the first periodic resource. In this case, if the coding rate is equal to or greater than the maximum coding rate, the first periodic resource is released and a second periodic resource is configured.

To further achieve these and other advantages and in accordance with the purpose of the present invention, according to a different embodiment, a user equipment performing direct communication between terminals in a wireless communication system includes wireless communication module configured to transceive a signal with a base station or a different user equipment, and a processor configured to process the signal, the processor configured to set a first periodic resource to transmit multiple messages via the direct communication between the terminals, the processor, if a coding rate corresponding to the first periodic resource is less than a maximum coding rate configured by an upper layer, configured to transmit the multiple messages using the first periodic resource, the processor, if the coding rate is equal to or greater than the maximum coding rate, configured to release the first periodic resource and set a second periodic resource.

Preferably, if the coding rate is equal to or greater than the maximum coding rate, the multiple messages are transmitted using the second periodic resource.

Preferably, a control signal including information on the first periodic resource and information on the second periodic resource for the direct communication between the terminals is separately transmitted. Meanwhile, the first periodic resource and the second periodic resource are randomly selected from at least one resource pool.

Additionally, if the coding rate is equal to or greater than the maximum coding rate, each of the multiple messages can be divided into sub messages of a prescribed size. In this case, the sub messages are transmitted using the first periodic resource.

Advantageous Effects

According to embodiments of the present invention, it is able to efficiently allocate resources for direct communication between terminals and it is able to efficiently transmit and receive a signal.

It will be appreciated by persons skilled in the art that that the effects that could be achieved with the present invention are not limited to what has been particularly described hereinabove and other advantages of the present invention will be more clearly understood from the following detailed description.

BEST MODE

Mode for Invention

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
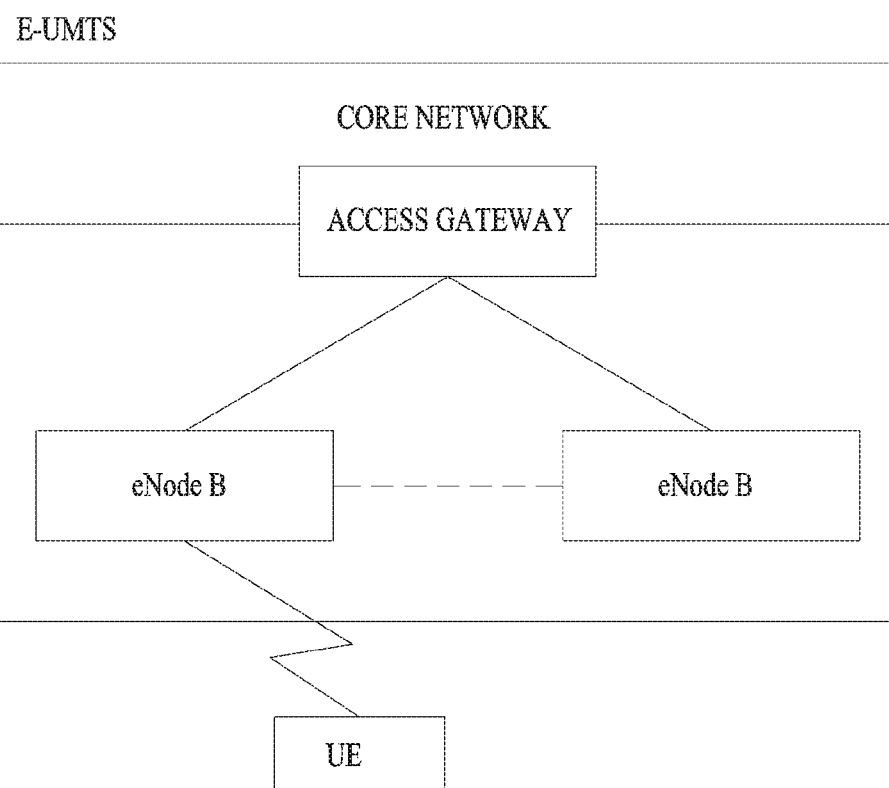
FIG. 1 is a diagram schematically illustrating a network structure of an E-UMTS as an exemplary radio communication system.
Figure 2:
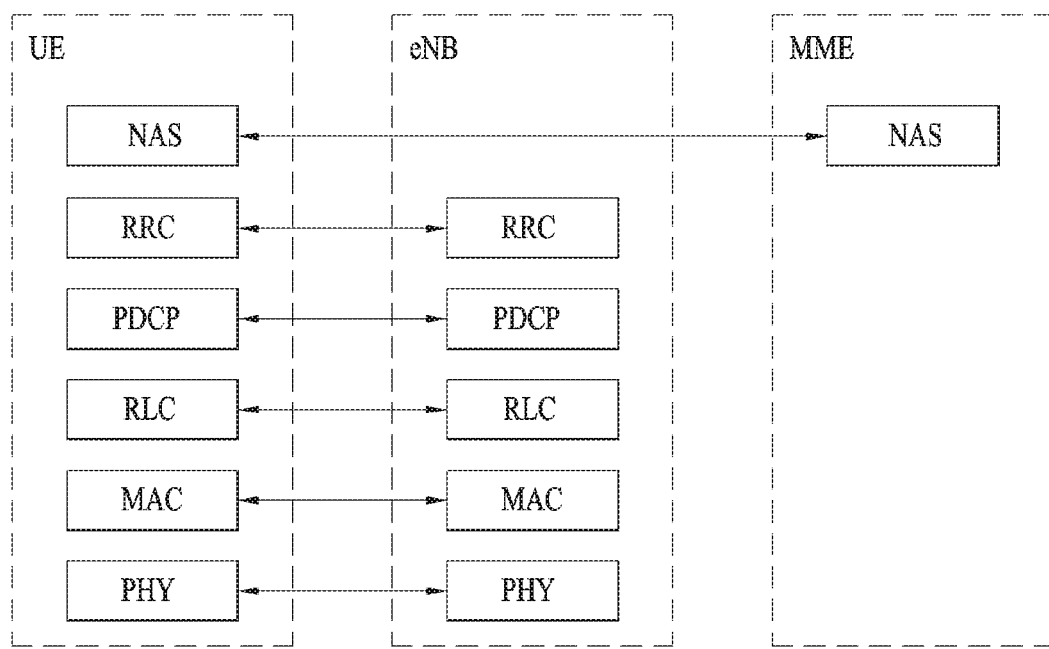
FIG. 2 is a diagram illustrating structures of a control plane and a user plane of a radio interface protocol between a UE and an E-UTRAN based on the 3GPP radio access network specification.
Figure 2:
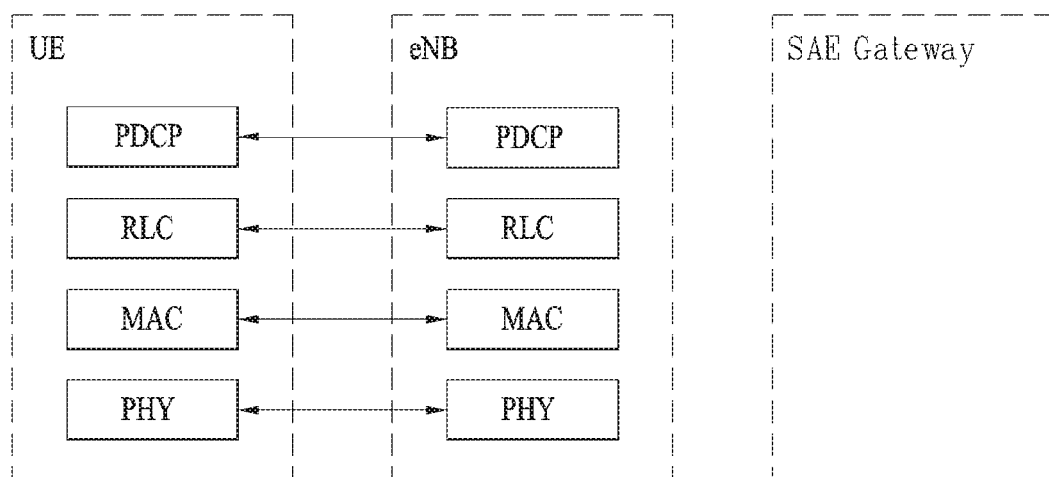

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A single cell consisting of an eNB is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
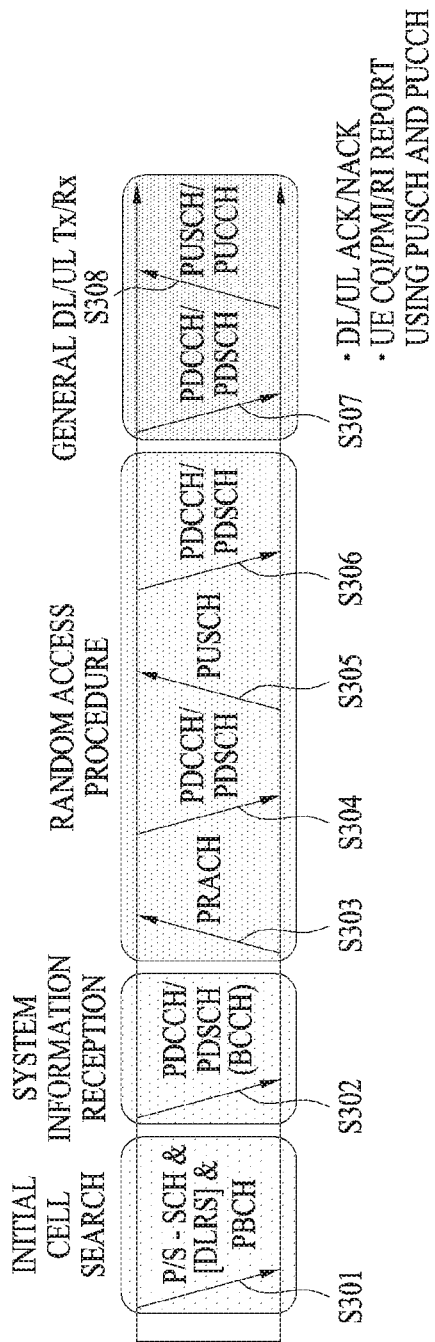
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DLRS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
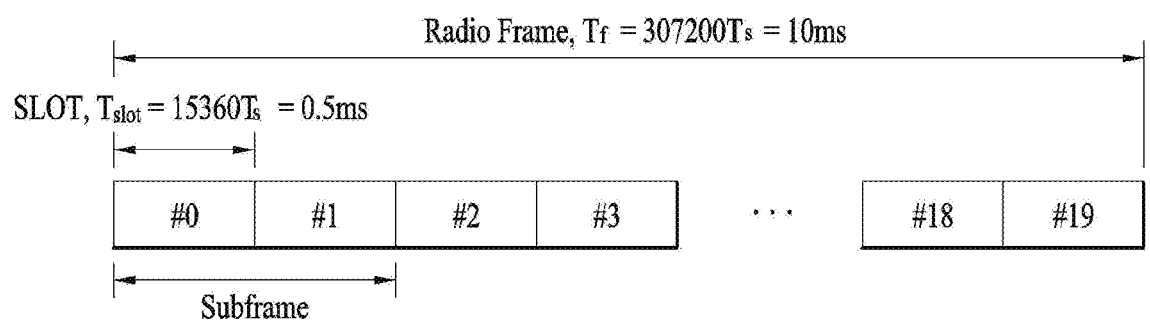
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360 T_s$). In this case, $T_s$ denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
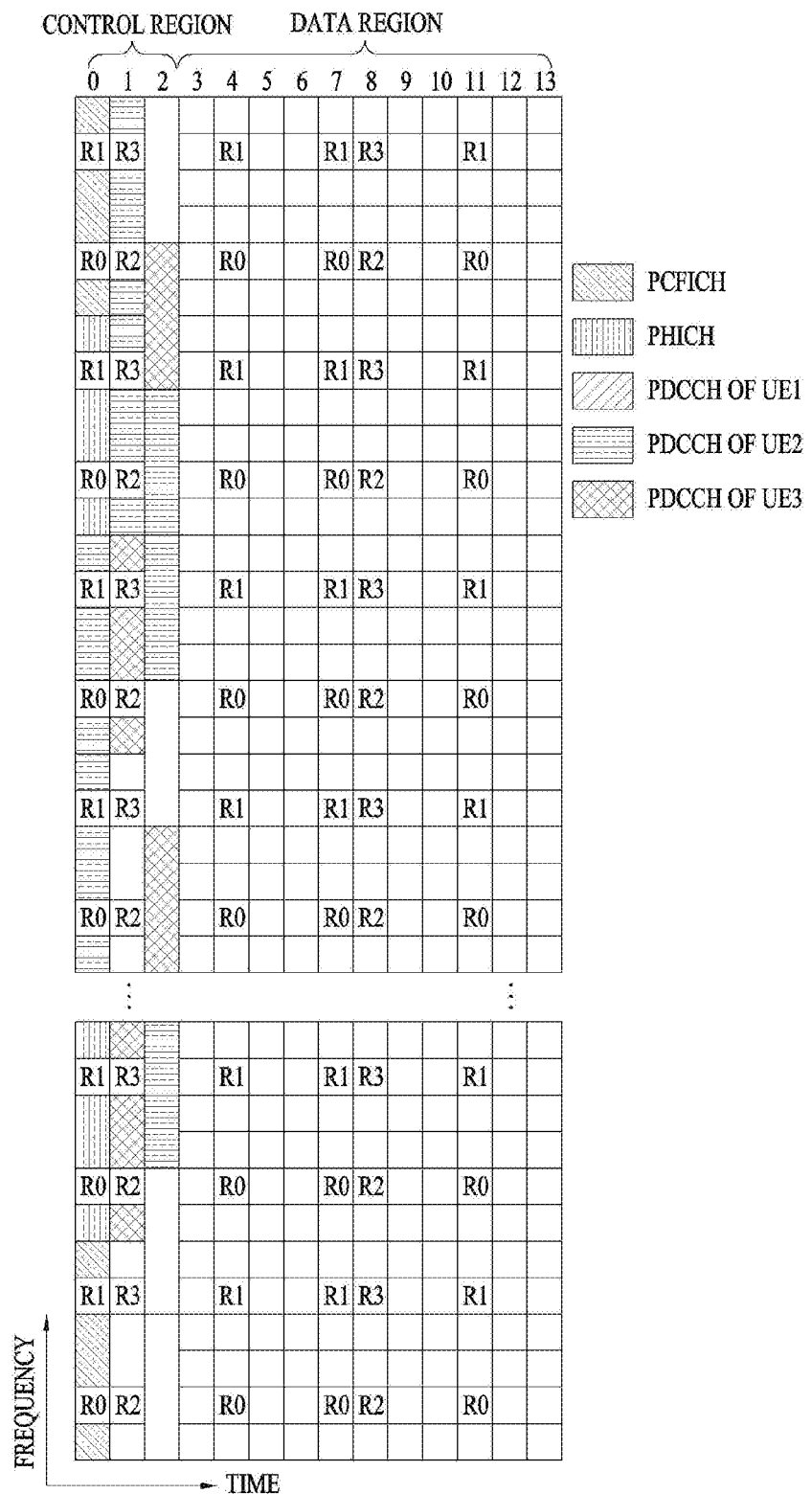
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
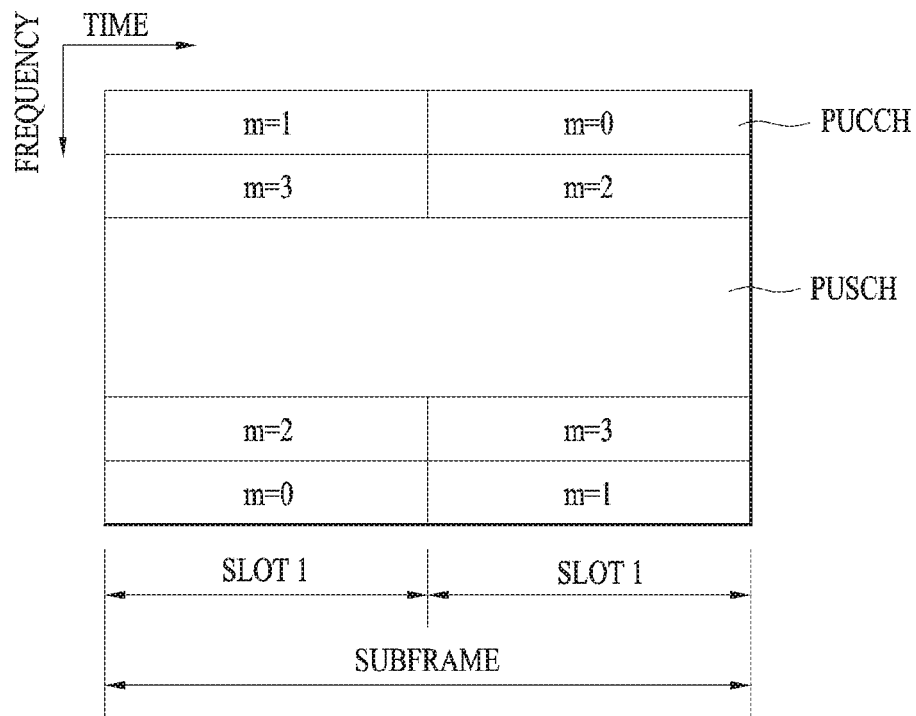
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an R1 for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Figure 7:
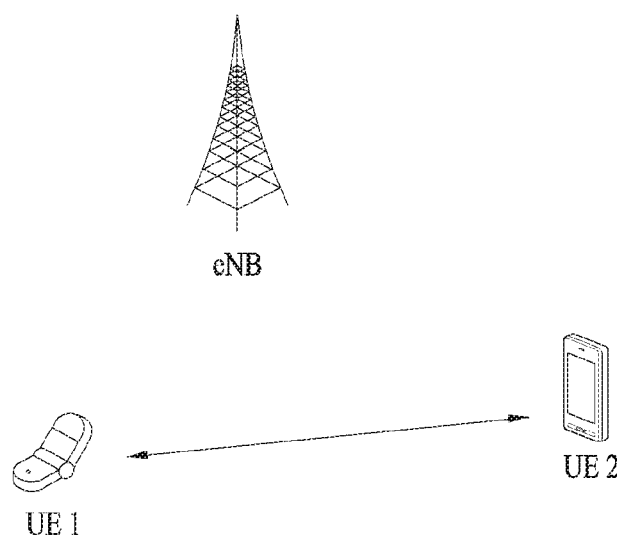
FIG. 7 is a conceptual diagram illustrating D2D communication.

FIG. 7 is a conceptual diagram illustrating direct D2D communication.

Referring to FIG. 7, during D2D communication (i.e., direct D2D communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link. Or, a link directly connected between UEs can be referred to as a sidelink as a concept in contrast to an uplink and a downlink.

Meanwhile, a case that a UE1 selects a resource unit corresponding to a specific resource from a resource pool corresponding to a set of resources and transmits a D2D signal using the selected resource unit is explained in the following. In this case, if the UE1 is located within coverage of an eNB, the eNB can inform the UE1 of the resource pool. If the UE1 is located at the outside of the coverage of the eNB, a different UE may inform the UE1 of the resource pool or the resource pool can be determined by predetermined resources. In general, the resource pool includes a plurality of resource units. Each UE selects one or more resource units and may be then able to use the selected resource unit(s) to transmit a D2D signal of the UE.

Figure 8:
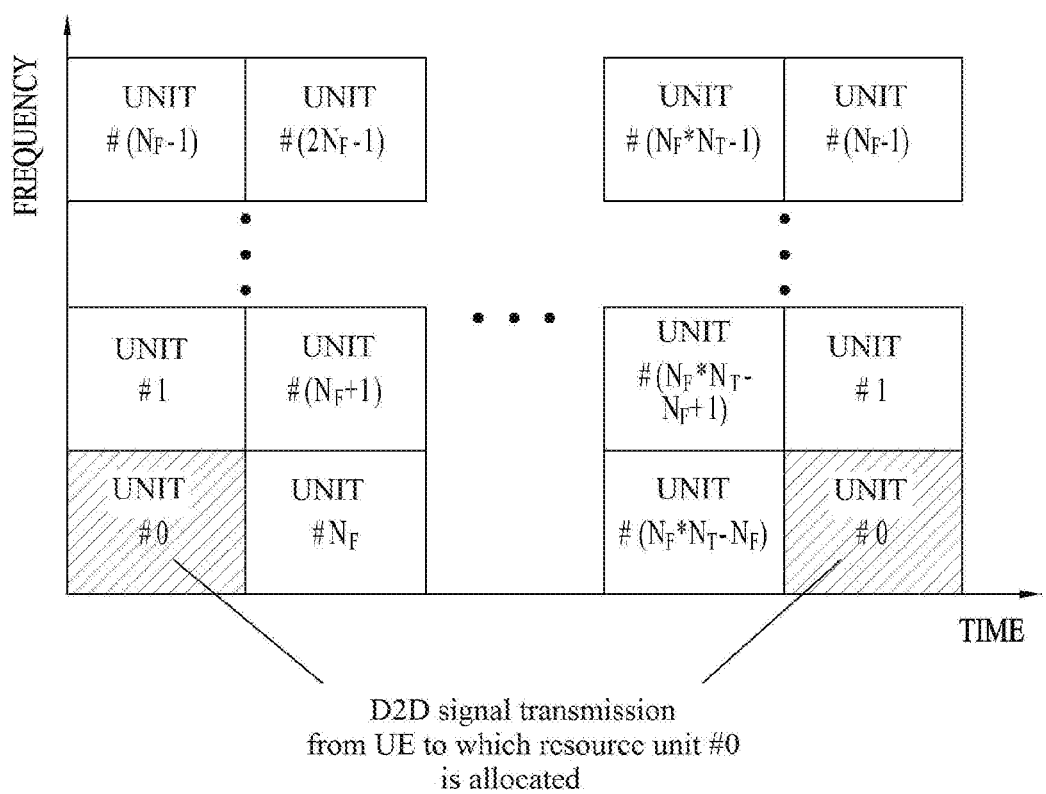
FIG. 8 illustrates an example of configuring a resource pool and a resource unit.

FIG. 8 is a diagram for configuration examples of a resource pool and a resource unit.

Referring to FIG. 8, it exemplary shows a case of defining $N_F*N_T$ number of resource units in total by dividing total frequency resources into $N_F$ and dividing total time resources into $N_T$. In particular, it shows that a corresponding resource pool is repeated with an interval of $N_T$ subframes. Particularly, one resource unit may periodically and repeatedly appear. Or, an index of a physical resource unit to which one logical resource unit is mapped may change in a predetermined pattern to obtain a diversity effect in time domain or frequency domain. In this resource unit structure, the resource pool may correspond to a set of resource units capable of being used for a UE to transmit a D2D signal.

The resource pool can be classified into various types. First of all, the resource pool can be classified according to contents of a D2D signal transmitted from the resource pool. For example, as shown in 1) to 3) in the following, the contents of the D2D signal can be classified into SA, a D2D data channel, and a discovery signal and a separate resource pool can be configured according to each of the contents.

1) Scheduling assignment (SA): SA may correspond to a signal including information on a resource position of a D2D data channel, information on MCS (modulation and coding scheme) necessary for demodulating a data channel, information on a MIMO transmission scheme, and the like. The SA information can be transmitted on an identical resource unit in a manner of being multiplexed with D2D data. In this case, an SA resource pool may correspond to a pool of resources in which SA and D2D data are transmitted in a manner of being multiplexed.

2) D2D data channel: A D2D data channel corresponds to a channel used by a transmission UE to transmit user data. If SA and a D2D data are transmitted on an identical resource unit in a manner of being multiplexed, a resource element (RE), which is used to transmit SA information in a specific resource unit of an SA resource pool, can also be used for transmitting D2D data in a D2D data channel resource pool.

3) Discovery signal: A discovery signal corresponds to a resource pool for transmitting a signal that enables a neighboring UE to discover a transmission UE transmitting information such as ID of the UE, and the like.

4) Synchronization signal/channel: A synchronization signal/channel can also be referred to as a sidelink synchronization signal or a sidelink broadcast channel. The synchronization signal/channel corresponds to a resource pool used for a transmission UE to transmit a synchronization signal/channel and information related to synchronization to a reception UE. By doing so, the reception UE is able to match time/frequency synchronization with the transmission UE.

SA and data are able to use resource pools separated from each other in a subframe. Yet, if a UE is able to transmit the SA and the data at the same time in a single subframe, two types of resource pools can be configured in the same subframe.

When a UE transmits a D2D message or an uplink message at specific timing, the UE can include information on a time position and/or a frequency position of a resource to be used in the future, i.e., information on a future resource, in the D2D message or the uplink message.

Figure 9:
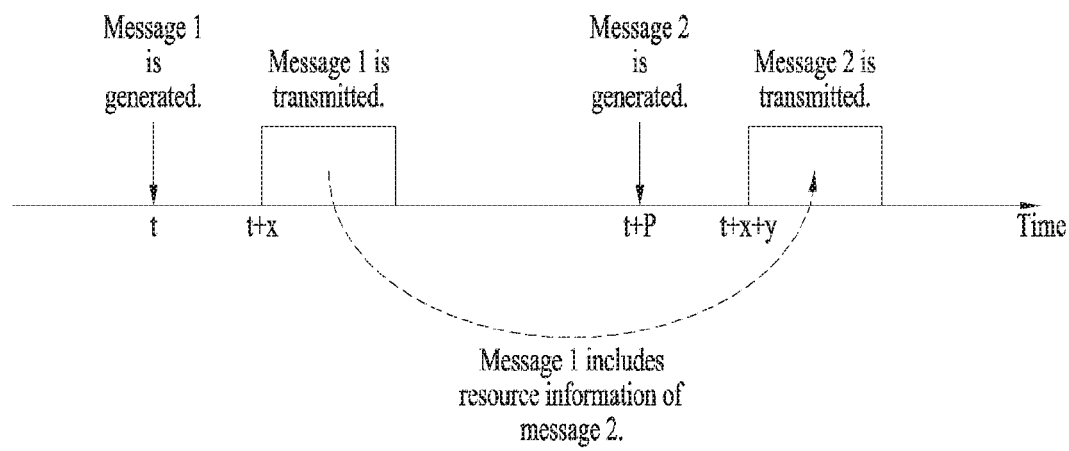
FIG. 9 is a diagram illustrating an operation of a UE transmitting future resource information in a manner of including the future resource information in a D2D message.

FIG. 9 is a diagram illustrating an operation of a UE transmitting future resource information in a manner of including the future resource information in a D2D message.

Referring to FIG. 9, when a UE transmits a D2D message which is generated with a certain period P, the UE may start to transmit a message 1 generated at timing t from the timing t+x. In this case, the message 1 can include a fact that a message 2, which is to be generated at a next period, is going to be transmitted at timing t+P+y using a specific frequency resource. By doing so, the UE can inform a different UE of information on a future resource. In this case, time x or time y corresponds to delay time between message generation and actual transmission. In general, a message generation period P may have a value equal to or greater than 100 ms. The information on the future resource can be transmitted via such a separate control channel as SA. Or, the information can be transmitted in a manner of being included in a data channel (e.g., a partial field of MAC header).

Figure 10:
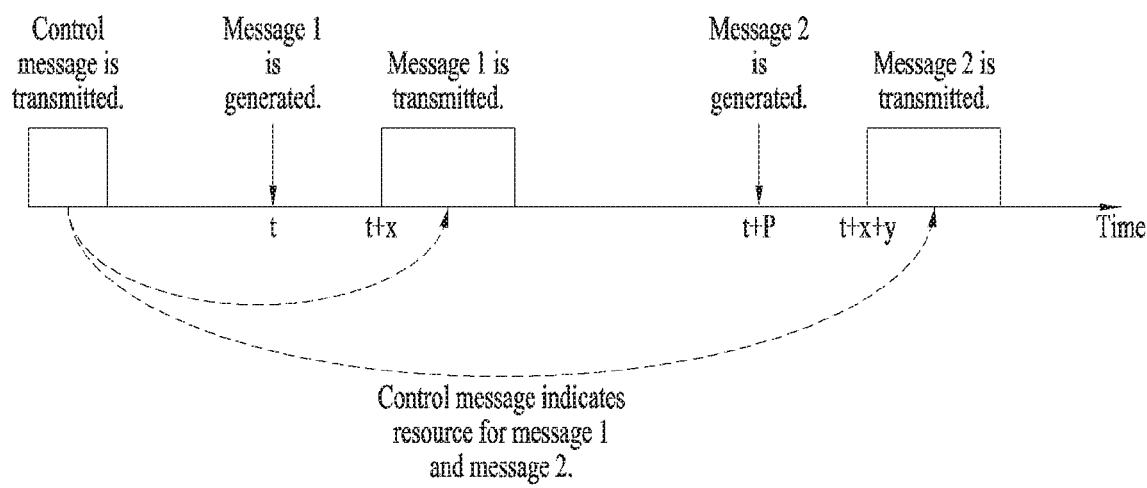
FIG. 10 is a diagram illustrating an operation of a UE transmitting future resource information in a manner of including the future resource information in a D2D message.

Or, a future resource can be designated using a method of designating a resource position in a plurality of periods via a single transmission of a control channel FIG. 10 is a diagram illustrating an operation of a UE transmitting future resource information in a manner of including the future resource information in a D2D message. The UE can transmit a periodically generated message to an eNB or a neighboring UE via a designated resource of the abovementioned form.

The operation is defined as periodic resource allocation. The periodic resource allocation means that a resource to be used by a UE periodically appears and a resource position of a next period is determined in advance in a previous period. A periodic resource can be designated by an eNB or a UE can autonomously determine the periodic resource.

Although a specific UE performs periodic resource allocation, the specific UE may use an undesignated resource. In particular, if a resource to be used for transmitting a message at a specific period is not designated in a previous period, although the specific UE performs the periodic resource allocation, the UE should use an undesignated resource. This is referred to as aperiodic resource allocation.

For example, when a different message is suddenly generated immediately after a message is transmitted at a prescribed period, if it is necessary to transmit the different message prior to a (time) resource of a next period, it may additionally use aperiodic resource allocation. When a UE autonomously determines a resource, the UE may use an aperiodic resource according to a prescribed rule. When an eNB designates a resource, a UE may ask the eNB to allocate an aperiodic resource and the eNB can allocate an appropriate resource to the UE.

In the following, an operation effective for a case that periodic resource allocation and aperiodic resource allocation coexist is explained.

If a specific message is generated, it is necessary for a UE to determine a resource allocation scheme to be used for the specific message among periodic resource allocation and aperiodic resource allocation.

As a method of determining a resource allocation method, it may consider a bearer and a logical channel ID at which a message is generated and a priority of a message. An eNB can configure the periodic resource allocation to be used for a message generated at a specific bearer and a logical channel ID or a message having a specific priority. If a message is generated at a different specific bearer and logical channel ID or a message has a different specific priority, the eNB can configure the aperiodic resource allocation to be used for the message. When a UE generates a message, the UE generates the message at an appropriate bearer and a logical channel ID according to an attribute of the message and a resource allocation method necessary for the message and may be able to assign an appropriate priority to the message.

As a different method of determining a resource allocation method, it may consider a message size. In the following, a size of a message is defined by the number of bits constructing a specific message generated in an upper layer. Yet, the same principle can be interpreted and applied to a size of a buffer in which a message is stored. In particular, if a message size is big, it may indicate that the great amounts of data are stored in a buffer at specific timing.

In general, a resource of a fixed size is designated via the periodic resource allocation. In this case, although a message is mapped to a periodic resource, a size of the message may vary. In particular, if a message of a big size is suddenly generated, it may be difficult to map the message to a stationary periodic resource. In this case, a UE can transmit the message temporarily using the aperiodic resource allocation. For example, it may be able to set an upper limit and a lower limit of a message size. If a size of a message is within the limit, the message is transmitted using a resource designated as a periodic resource as it is. If a size of a message is out of the limit, the message is transmitted using an aperiodic resource. An eNB can configure the upper limit and the lower limit of the message size in advance via higher layer signaling such as RRC or the like. The upper limit and the lower limit can be implemented in a form of an upper limit and a lower limit of a coding rate. In particular, the upper limit of the message size and the upper limit of the coding rate can be configured by a value capable of achieving minimum stability necessary for transmitting a corresponding message. In particular, if a message of a size greater than the upper limit is transmitted, it may indicate that it is unable to achieve minimally required stability.

If a UE transmits a specific message using an aperiodic resource, a periodic resource of a specific period is not used. Yet, if a different UE reads a periodic resource allocation message of the UE and empties out a corresponding resource, resource waste occurs. Hence, it is preferable for the UE to perform aperiodic resource allocation while utilizing a periodic resource reserved by the UE. For example, in this case, if the different UE does not use an aperiodic resource, the UE can configure the aperiodic resource to mandatorily include the periodic resource reserved by the UE.

It may be able to configure a size of an aperiodic resource to be equal to or less than a prescribed level compared to a size of a periodic resource. In this case, in case of using a different resource (including a part of a legacy periodic resource) via aperiodic resource allocation without using a previously used periodic resource, it may be able to continuously use the aperiodic resource. Consequently, when an aperiodic resource is used without using a periodic resource, it can be considered as a position and/or a size of a periodic resource is changed or a periodic resource is reselected.

When periodic resource allocation or aperiodic resource allocation is selected according to the message size, it can be interpreted as to determine whether or not a position and/or a size of a periodic resource is changed according to the message size.

Meanwhile, if a size of a message is instantaneously changed, the message is transmitted by selecting an aperiodic resource one time and a next message is configured to use an original periodic resource. On the contrary, if a size of a message is continuously changed, it is more profitable to continuously use a resource once selected as an aperiodic resource. More generally, if a message size or a buffer size exceeds a prescribed limit and is not appropriate for a legacy periodic resource, for example, if a situation incapable of performing transmission continuously occurs N times, it may be able to configure a periodic resource to be selected again. Specifically, an $N^{th}$ selected aperiodic resource can be continuously used in a manner of being regarded as a new periodic resource.

When the aforementioned operation is performed, it may be able to transmit a message of a size exceeding a prescribed limit using both a periodic resource and an aperiodic resource. In particular, when a message of a big size is generated, the message is preferentially transmitted using a periodically allocated resource. If it is determined that a reception success rate of the message is lower than a target level, the same message is transmitted one more time using aperiodic resource allocation. By doing so, it may be able to expect that a reception UE successfully receives the message via one of the two transmissions. Or, it may be able to configure the reception UE to attempt to receive the message by combining the two transmissions. In particular, when the reception UE receives the message by combining the two transmissions, it is necessary for the reception UE to identify a transmission signal capable of being combined. Hence, a HARQ process ID should be included in scheduling control information. Or, an indicator indicating whether or not it is feasible to combine a transmission signal according to periodic resource allocation transmitted in the same period can be included in an aperiodic resource allocation signal.

As a variation of the operation of transmitting the message (or, data of a size exceeding a prescribed limit stored in a buffer) of the size exceeding the prescribed limit using both the periodic resource and the aperiodic resource, the message of the size exceeding the prescribed limit can be divided into a plurality of transport blocks. In particular, a part of a plurality of the transport blocks is transmitted via a periodic resource and the remaining part of a plurality of the transport blocks can be transmitted via an aperiodic resource. In particular, if a message size (or, a buffer size) does not exceed a prescribed limit, it is regulated that a future resource designated in a transmission of a previous period is used only. And, a transmission performed using an aperiodic resource, which uses an additional resource, is not allowed.

This operation has a characteristic in that a resource allocation scheme in use is selected from among periodic allocation and aperiodic allocation according to a size of a message (or, a buffer) for a data generated by a single QoS (quality of service) or a data generated by a service having a priority. In particular, as mentioned in the foregoing description, in a situation that a data having a specific priority (e.g., an emergency data to be promptly transmitted) does not occur, if a UE designates a future resource via a previous transmission, the UE can perform transmission using a resource rather than a resource designated as the future resource only when a size of a message (or, a buffer) is equal to or greater than a prescribed level.

As a different meaning, when periodic resource allocation is determined for a specific communication service (e.g., a communication service broadcasting a location, speed, a device status, etc. of a vehicle with a prescribed period), a prescribed resource is periodically used, and the determined periodic resource allocation and the prescribed resource are notified to a receiving end, a transmitting end may allow aperiodic resource allocation to be used for the service only when a size of a message (or, a buffer) generated by the service at specific timing exceeds a prescribed limit.

Figure 11:
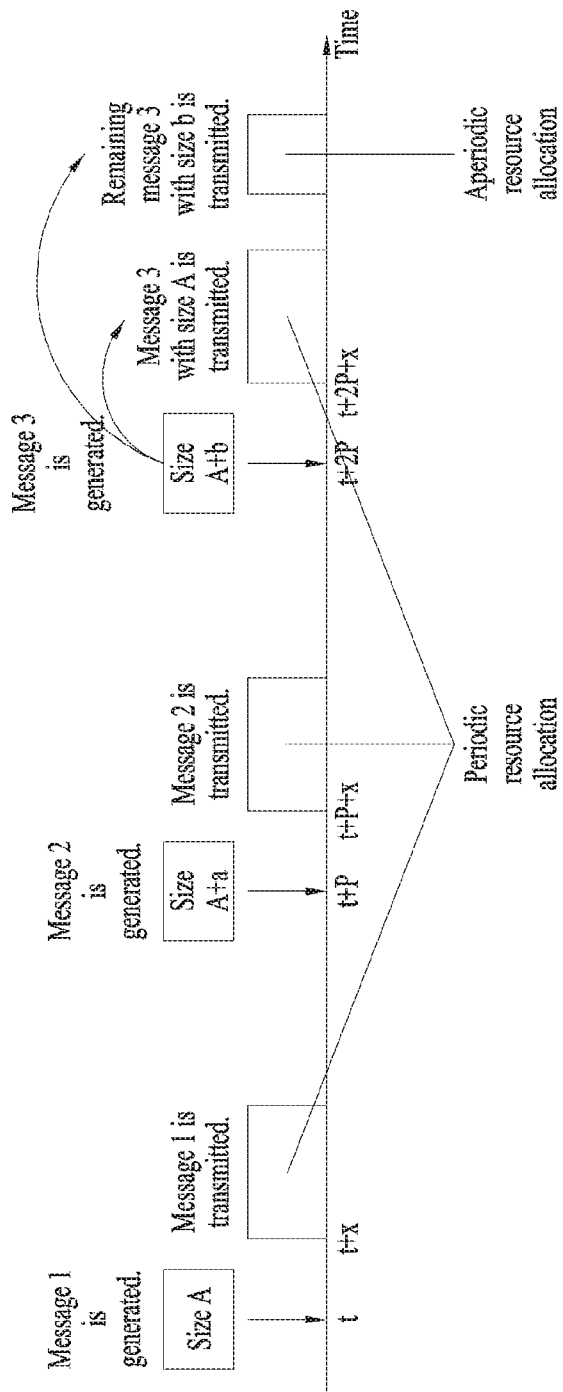
FIG. 11 is a diagram illustrating an example of periodically and aperiodically allocating resources according to an embodiment of the present invention.

FIG. 11 is a diagram illustrating an example of periodically and aperiodically allocating resources according to an embodiment of the present invention. In particular, in FIG. 11, assume a case that a size of a message corresponding to the same service varies when a periodic resource is allocated with a period of P.

Referring to FIG. 11, it is able to see that a message of size A and a message of size A+a are generated at the timing t and the timing t+P, respectively. In this case, since a size of a is equal to or less than a prescribed level, a periodic resource is used only.

On the contrary, when a message of size A+b is generated at the timing t+2P, since a size of b is equal to greater than a prescribed level, a UE divides the message into two parts. A part of a size of A is transmitted via a periodic resource and then a part of a size of B is additionally transmitted via aperiodic resource allocation.

Meanwhile, a UE reads a resource allocation message of a different UE and may be then able to avoid a resource collision. In this case, if the abovementioned operation of the present invention is applied, a case that the same UE examines a case of allocating resources of two types at the same time may occur. One is to examine the case via periodic resource allocation and another is to examine the case via aperiodic resource allocation. Since a single UE is unable to use two resources at the same time, the UE may regard a periodically allocated resource as a temporarily available resource by recognizing that a corresponding UE is going to use an aperiodically allocated resource only. This information may correspond to information utilized by a different UE to perform aperiodic resource allocation.

To this end, an ID of a transmission UE can be included in a resource allocation control message. Yet, if a size of the control message is limitative, it is difficult to include the ID of the transmission UE in the control message. In this case, a plurality of UEs may transmit the same ID information to the control message. Hence, it may consider that all resources designated by a periodic resource allocation control message or an aperiodic resource allocation control message are actually used by a different UE.

When a resource is periodically configured, if a resource is aperiodically allocated, a message to be transmitted is additionally generated. In this case, a UE selects an aperiodic resource using a resource unoccupied by a different UE and may be then able to transmit the message. In this case, the UE regards a resource designated by the UE to perform periodic resource allocation as a resource occupied by the different UE to select an aperiodic resource. For example, if the UE randomly selects a part of resources unoccupied by the different UE from a resource pool, similar to a resource occupied by the different UE, a resource designated by the UE using periodic resource allocation is excluded from a target of aperiodic resource selection. In this case, if a specific aperiodic resource is (partly) overlapped with a periodic allocation resource, the aperiodic resource can be excluded from the selection.

Moreover, if it is difficult for the UE to transmit two messages (or, two physical channels) at the same time, the UE can exclude both the resource designated by the UE using periodic resource allocation and a UE belonging to the same timing from a target of aperiodic resource selection. The UE is unable to perform aperiodic transmission at the corresponding timing because the UE performs periodic transmission at the timing. Hence, it is necessary to prevent a resource of a different frequency from being selected as an aperiodic transmission resource at the timing.

Or, in order to prevent a single UE from excessively occupying a periodic resource and an aperiodic resource, a resource periodically configured by the UE is also included in a target of aperiodic resource selection. When a resource is selected according to a series of selection procedures, it may perform transmission according to aperiodic resource selection using the resource. In this case, a transmission according to periodic resource allocation can be dropped. In this case, although the periodic resource allocation is overlapped with the aperiodic resource allocation in partial time only, since it is difficult for a different UE to know the fact, the entire periodic resource allocation of a corresponding period can be dropped. Or, it may be able to move a position of a periodic resource to a different position or reduce a size of a resource occupied by a periodic message temporarily.

Meanwhile, in a situation that a periodic resource is fixedly reserved, a UE may designate a size of a transport block all the time to more efficiently process a variable message.

In a general resource allocation structure, a size of a transmitted transport block is automatically determined according to a modulation order in use and a size of a resource in use. And, in a legacy LTE system, scheduling information included in a control channel informs a reception UE of a modulation order and a resource size and the reception UE identifies a size of a transport block using the scheduling information. This property is also maintained in periodic resource allocation including SPS (semi-persistent scheduling). However, according to the aforementioned situation, while a message size varies, a modulation order and a resource size are fixed by previous control information. Hence, a size of a transport block is fixed. Consequently, zero padding is performed on a message, thereby increasing inefficiency.

In order to solve the inefficiency, it may consider a) or b) described in the following.

a) In case of performing periodic resource allocation, a position of a resource is designated only and a modulation order is separately designated whenever a message is transmitted. In particular, while a position of a resource used in a specific period is determined in a previous period or previous timing, a modulation order is differently designated according to a period. Since information on a modulation order is transmitted together with data, the information can be transmitted via a part of a periodically allocated resource. Or, the information can be transmitted to a reception UE by differentiating a sequence or a position of a reference signal according to a modulation order.

As an example of transmitting the information on the modulation order via a part of a periodic allocation resource, separate channel coding is applied to the information on the modulation order irrespective of data and the information is multiplexed with a data signal. In this case, since it is necessary for a reception UE to identify a resource from which the information on the modulation order is transmitted, it is preferable to fix a position of the resource. A signal transmitted by a UE may have a form of SC-FDMA to reduce PARR. In this case, the modulation order information is transmitted from all or a part of SC-FDMA symbols. The modulation order information and data are mapped to a different logical RE of a symbol and DFT spreading is performed on the information and the data to generate a time domain transmission signal.

As an example of using a sequence of a reference signal, CS (cyclic shift) or an OCC (orthogonal cover code) to be applied to a reference signal sequence are mapped to a specific modulation order in advance and a UE can transmit a reference signal using CS or OCC corresponding to a modulation order of each transmission timing. If a size of a message is getting bigger, a size of a transport block is increased using high order modulation to map the message to a fixed resource size. If a size of a message is getting smaller, it may be able to more stably transmit the message using low order modulation.

b) A modulation order as well as a resource position can be determined in a previous period. And, a size of a transport block is designated using separate control information. Similar to the a), the information can be transmitted via a part of a periodically allocated resource. Or, the information can be forwarded to a reception UE by differentiating a sequence or a position of a reference signal according to a size of a transport block.

As an example of transmitting information on a transport block size via a part of a periodic allocation resource, separate channel coding is applied to the information irrespective of data and the information is multiplexed with a data signal. In this case, since it is necessary for a reception UE to identify a resource from which the information on the transport block size is transmitted, it is preferable to fix a position of the resource. A signal transmitted by a UE may have a form of SC-FDMA to reduce PARR. In this case, the information on the transport block size is transmitted from all or a part of SC-FDMA symbols. The modulation and data signaling are mapped to a different logical RE of a symbol and DFT spreading is performed on the information and the data to generate a time domain transmission signal.

As an example of using a sequence of a reference signal, CS or an OCC to be applied to a reference signal sequence are mapped to a specific transport block size in advance and a UE can transmit a reference signal using CS or OCC corresponding to a transport block size of each transmission timing. A size of a transport block available for a given resource size and a modulation order is restricted to several sizes. A size most suitable for an actual message (e.g., a smallest size or a size closest to the smallest size among sizes equal to or greater than the message) is selected and the selected size is used as a transport block size of a corresponding period. In particular, if a size of a message is small, it may be able to reduce a transport block size. It may be able to more obtain a channel coding gain in preparation for a case of performing zero padding in a transport block generation stage.

While resource information is transmitted in a previous period or previous timing, it may be able to make a modulation order and a transport block size vary at the timing at which data is transmitted by combining the a) scheme and the b) scheme.

Meanwhile, if a message or a transport block of a different size is transmitted in a resource of a fixed size according to the aforementioned operation, since a coding rate is changed, it is difficult to have uniform performance. In particular, if a size of a message or a transport block is big, since it is necessary to transmit more bits with a given resource, a transmission success rate is deteriorated.

In order to offset the deterioration of the transmission success rate, it may be able to control transmit power according to a size of a message or a transport block transmitted in a periodically allocated resource and a modulation order in use. In particular, in case of transmitting more bits, stronger power is used. As a different meaning, in case of transmitting a message or a transport block of a small size, a UE reduces transmit power to enable closely located UEs to use a corresponding resource together with the UE. By doing so, it may be able to enhance overall system performance.

In this case, if transmit power is too low, it is difficult to detect a signal itself and difficult to guarantee minimum performance in detecting a different control signal transmitted together with the signal. In order to prevent the above-mentioned problem, it may be able to provide minimum transmit power to a UE to be used by the UE for performing transmission. In this case, if there is a signal transmitted on a different carrier, it may be able to transmit a bigger message with stronger power by additionally receiving power. In particular, it means that a ratio of distributing power with a signal transmitted on a different carrier is changed according to a size of a message to be transmitted in a periodically allocated resource.

For example, when a different signal is transmitted on a second carrier while the aforementioned operation is performed via a first carrier, i.e., in case of transmitting PUSCH triggered via a UL grant received from an eNB, minimum power used for performing transmission on the first carrier is designated and power rather than the minimum power can be used for performing transmission on the second carrier. In this case, the minimum power guaranteed on the first carrier may vary depending on a message size on the first carrier. In case of transmitting a smaller message, smaller minimum power can be guaranteed. As a result, when a UE transmits a bigger message on the first carrier, it is necessary to guarantee more power. As a result, power usable for performing transmission on the second carrier is reduced. More specifically, the minimum power guaranteed on the first carrier is determined according to a size of a message transmitted on the first carrier or a coding rate. When a basic minimum power is configured, it may be able to add power as much as a prescribed offset for a bigger message size or a bigger coding rate.

As a different example, it may be able to define minimum power guaranteed on the second carrier. A value of the minimum power may vary depending on a size of a message transmitted on the first carrier. In particular, in case of transmitting a bigger message on the first carrier, the minimum power guaranteed on the second carrier can be reduced. Specifically, the minimum power guaranteed on the second carrier is determined according to a size of a message transmitted on the first carrier or a coding rate. When a basic minimum power of the second carrier is configured, it may be able to reduce power as much as a prescribed offset for a bigger message size transmitted on the first carrier or a bigger coding rate.

Meanwhile, when an eNB allocates a periodic resource to a UE, if an amount of data occurred on the UE is too excessive to be transmitted to the periodic resource, it is preferable to inform the eNB of the amount of data and receive more resources from the eNB. In this case, the resources allocated by the eNB may correspond to a resource for performing UL transmission to the eNB or a resource for performing D2D transmission to a different UE. In most cases, a message occurred on the UE can be transmitted using the periodic resource allocated by the eNB. Yet, as mentioned in the foregoing description, if data exceeding a prescribed limit occurs, it is necessary to have an additional resource.

Specifically, the UE may inform the eNB that an additional resource is required. To this end, the UE may use an SR (scheduling request) and/or a BSR (buffer status report). In this case, it is necessary to minimize signaling overhead. If the previously allocated periodic resource is sufficient enough for minimizing the signaling overhead, the UE can omit transmission of the SR and/or the BSR. In other word, the SR and/or the BSR are transmitted only when a data size of a service to be transmitted by the periodic resource exceeds a prescribed limit to induce the eNB to allocate a resource. In particular, if the size of the data occurred on the UE exists at a region capable of stably transmitting the data using the previously allocated periodic resource, the UE continuously uses the periodic resource without transmitting the unnecessary SR/BSR. By doing so, it may be able to reduce signaling overhead and power consumption of the UE.

As a different method, when a resource periodically allocated by the eNB corresponds to a resource for performing D2D transmission, if data occurred on the UE has a size exceeding a prescribed limit, the UE autonomously selects a resource in addition to the periodically allocated resource and the autonomously selected resource can be used for transmitting the data together with the periodically allocated resource. The abovementioned operation basically follows the principle mentioned earlier in FIG. 11. Yet, the periodic resource is allocated by the eNB, whereas the additionally used resource is autonomously selected by the UE without resource allocation of the eNB.

When the UE autonomously selects a resource, the UE identifies resource allocation information of a different UE to avoid a collision with a resource selected by the different UE. Or, the UE measures energy of each resource to preferentially select a resource rather than a resource already used by the different UE.

Figure 12:
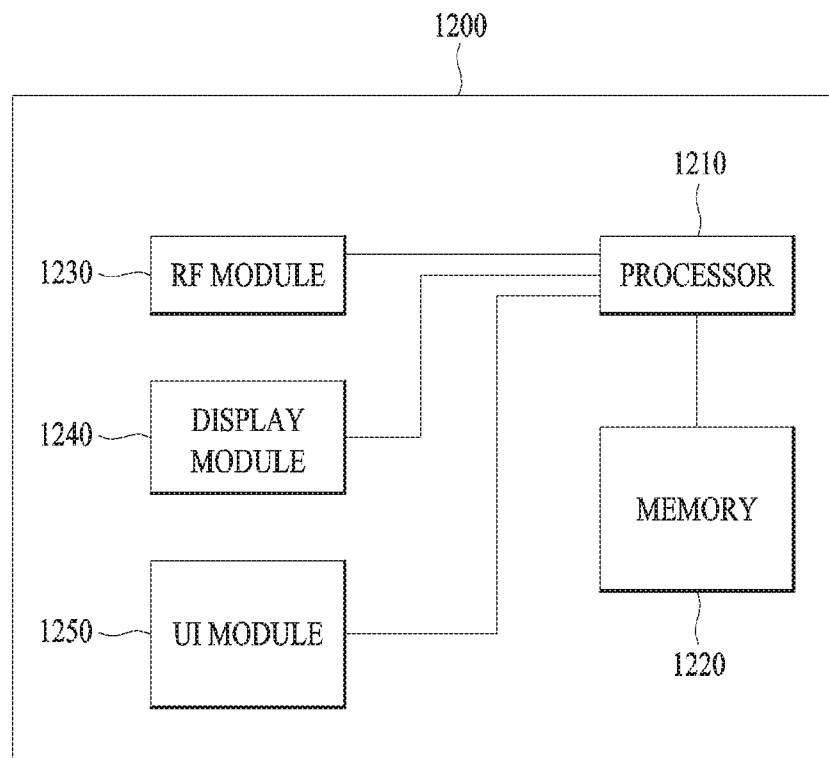
FIG. 12 is a block diagram illustrating a communication device according to embodiments of the present invention.

FIG. 12 is a block diagram of a communication apparatus according to an embodiment of the present invention.

Referring to FIG. 12, a communication device 1200 includes a processor 1210, a memory 1220, a radio frequency (RF) module 1230, a display module 1240, and a user interface (UI) module 1250.

The communication device 1200 is illustrated for convenience of description and some modules may be omitted. The communication device 1200 may further include necessary modules. Some modules of the communication device 1200 may be further divided into sub-modules. The processor 1200 is configured to perform operations according to the embodiments of the present invention exemplarily described with reference to the drawings. Specifically, for a detailed description of operations of the processor 1200, reference may be made to the description described with reference to FIGS. 1 to 11.

The memory 1220 is connected to the processor 1210 and stores operating systems, applications, program code, data, and the like. The RF module 1230 is connected to the processor 1210 and performs a function of converting a baseband signal into a radio signal or converting a radio signal into a baseband signal. For this, the RF module 1230 performs analog conversion, amplification, filtering, and frequency upconversion or performs inverse processes thereof. The display module 1240 is connected to the processor 1210 and displays various types of information. The display module 1240 may include, but is not limited to, a well-known element such as a liquid crystal display (LCD), a light emitting diode (LED), or an organic light emitting diode (OLED). The UI module 1250 is connected to the processor 1210 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of allocating a resource for performing direct communication between terminals in a wireless communication system and an apparatus therefor are described with reference to examples applied to 3GPP LTE system, it may be applicable to various kinds of wireless communication systems as well as the 3GPP LTE system.

What is claimed is:

1. A method for communicating by a first user equipment (UE) in a wireless communication system, the method performed by the first UE and comprising:
configuring a sidelink resource;
obtaining data related to an upper layer;
receiving, from a base station, information on configuring a maximum coding rate used for transmissions on the configured sidelink resource; and
based on that the configured sidelink resource cannot accommodate the data by using the maximum coding rate and the first UE is configured to determine not to divide the data, re-configuring the sidelink resource.

2. The method of claim 1, further comprising:
transmitting, to the second UE, the data on the re-configured sidelink resource.

3. The method of claim 1, wherein the configured sidelink resource and the re-configured sidelink resource are randomly selected from at least one resource pool, respectively.

4. The method of claim 1, further comprising:
based on that the sidelink resource cannot accommodate the data based on the maximum coding rate and the first UE determines to divide the data, dividing the data into sub-data with a predetermined size; and
transmitting the sub-data, to the second UE, on the configured sidelink resource.

5. A first user equipment (UE) for tran communicating in a wireless communication system, the first UE comprising:
a memory;
at least one processor coupled with the memory,
wherein the at least one processor is configured to:
configure a sidelink resource;
obtain data related to an upper layer;
receive, from a base station, information on configuring a maximum coding rate used for transmissions on the configured sidelink resource; and
based on that the configured sidelink resource cannot accommodate the data by using the maximum coding rate and the at least one processor is configured to determine not to divide the data, re-configure the sidelink resource.

6. The first UE of claim 5, wherein the at least one processor is further configured to transmit the data, to the second UE, on the re-configured sidelink resource.

7. The first UE of claim 5, wherein the configured sidelink resource and the re-configured sidelink resource are randomly selected from at least one resource pool, respectively.

8. The first UE of claim 5,
based on that the sidelink resource cannot accommodate the data based on the maximum coding rate and the at least one processor determines to divide the data, the at least one processor is further configured to transmit the data into sub-data with a predetermined size, and
wherein the at least one processor transmits the sub-data, to the second UE, on the configured sidelink resource.

9. The method of claim 1, further comprising: based on that the configured sidelink resource accommodates the data by using the maximum coding rate, transmitting, by the first UE to a second UE, the data on the configured sidelink resource.

10. The method of claim 9, wherein based on that the configured sidelink resource accommodates the data by using the maximum coding rate, the data, transmitted on the configured sidelink resource, is coded by using a coding rate equal or less than the maximum coding rate.

* * * * *